US007752949B2

(12) United States Patent
Tsai

(10) Patent No.: US 7,752,949 B2
(45) Date of Patent: Jul. 13, 2010

(54) TISSUE PAPER CUTTING MECHANISM HAVING UPPER KNIFE ARM WITH VARIABLE SPIRAL CURVE ANGLE AND UPPER KNIFE STRUCTURE THEREFOR

(75) Inventor: Tung-I Tsai, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 233 days.

(21) Appl. No.: 11/723,422

(22) Filed: Mar. 20, 2007

(65) Prior Publication Data

US 2008/0078275 A1 Apr. 3, 2008

Related U.S. Application Data

(63) Continuation-in-part of application No. 11/528,598, filed on Sep. 28, 2006, now abandoned.

(51) Int. Cl.
*B23D 25/12* (2006.01)

(52) U.S. Cl. .......................................... 83/342; 83/672

(58) Field of Classification Search ................... 83/340, 83/564, 563, 672, 342
See application file for complete search history.

(56) References Cited

U.S. PATENT DOCUMENTS 2,183,722 A * 12/1939 Newman ..................... 83/345
2,601,200 A * 6/1952 Amos et al. .................... 225/5

(Continued)

FOREIGN PATENT DOCUMENTS

DE 2117966 12/1971

(Continued)

OTHER PUBLICATIONS

Communication from the European Patent Office regarding a corresponding foreign application dated Jun. 23, 2008.

*Primary Examiner*—Kenneth E. Peterson
*Assistant Examiner*—Sean Michalski
(74) *Attorney, Agent, or Firm*—Rosenberg, Klein & Lee

(57) ABSTRACT

A tissue paper cutting mechanism having upper knife with variable spiral curve angle includes a base, a bed knife roller rotatably mounted on the base and provided on a circumferential surface with a plurality of straight bed knives radially spaced at predetermined intervals, a knife carrier mounted on the base near the bed knife roller at an axis skew angle relative to the bed knife roller, and an upper knife associated with a structural surface of the knife carrier to extend along a longitudinal axis direction of the knife carrier from an end to another opposite end thereof in a spiral direction, such that an angle contained between an axis of the upper knife and a tangential line to the circumferential surface of the bed knife roller non-linearly varies with every change of the cutting position on the upper knife.

6 Claims, 15 Drawing Sheets

U.S. PATENT DOCUMENTS

| | | | | | |
|---|---|---|---|---|---|
| 3,190,163 | A | | 6/1965 | Bradley | |
| 3,515,618 | A | * | 6/1970 | Sidles | 118/608 |
| 3,543,622 | A | * | 12/1970 | Rice | 83/117 |
| 3,606,813 | A | * | 9/1971 | Hallden | 83/672 |
| 3,822,625 | A | * | 7/1974 | Obenshain | 83/342 |
| 3,975,974 | A | * | 8/1976 | Harris | 83/861 |
| 4,014,234 | A | * | 3/1977 | Spengler | 83/162 |
| 4,561,335 | A | * | 12/1985 | Wingen | 83/481 |
| 4,630,514 | A | * | 12/1986 | Ohmori et al. | 83/342 |
| 7,484,445 | B2 | * | 2/2009 | De Marco et al. | 83/342 |
| 2002/0124703 | A1 | * | 9/2002 | Stevens | 83/282 |
| 2006/0288827 | A1 | * | 12/2006 | Ishibuchi et al. | 83/13 |

FOREIGN PATENT DOCUMENTS

| | | |
|---|---|---|
| DE | 3718776 | 8/1988 |
| EP | 0122996 | 10/1984 |

* cited by examiner

TISSUE PAPER CUTTING MECHANISM HAVING UPPER KNIFE ARM WITH VARIABLE SPIRAL CURVE ANGLE AND UPPER KNIFE STRUCTURE THEREFOR

CROSS-REFERENCES TO RELATED APPLICATIONS

This application is a continuation-in-part of Ser. No. 11/528,598 filed on Sep. 28, 2006, now abandoned entitled "One-Piece Unequal Angle Curved Knife Carrier Unit".

FIELD OF THE INVENTION

The present invention relates to a knife carrier of a cutting machine, and more particularly to an upper knife with variable spiral curve angle as well as a tissue paper cutting mechanism using such upper knife. A long tape of tissue paper fed into and conveyed through the tissue paper cutting mechanism is cut by the upper knife and a cooperating bed knife roller into regular length paper pieces, which are then overlapped and folded to produce a stack of interfolded paper.

BACKGROUND OF THE INVENTION

Many different cutting techniques have been developed for cutting tissue paper. For example, there is a conventional roller-type straight-knife cutting mechanism consisting of an inline knife and a roller. In a paper cutting operation, a long tape of paper to be cut is wound around the roller, and the roller is caused to continuously rotate while the knife reciprocates vertically corresponding to the rotating roller. When a cutting edge of the knife contacts with the roller, the paper is cut.

However, during the conventional paper cutting operation, the cutting edge of the knife and the long tape of paper wound around the roller are in line contact with each other. At the instant of contact, the cutting edge of the knife bears a considerably large normal or angular contact force and therefore tends to break easily.

In the existing tissue paper cutting techniques, a cutting manner based on the shearing principle by using an upper knife and a corresponding bed knife roller has been widely employed. Most currently very common tissue paper cutting mechanisms include a one-piece oblique knife, a compound oblique knife, or a simple spiral curve knife as the upper knife thereof. When cutting paper with these types of knives, they either bear an uneven contact force or contact with the bed knife roller at multiple contact points at the same time. As a result, not only the upper knife, but also a knife carrier thereof and the bed knife roller would bear a relatively large or uneven impact at the instant of contact to become deformed or damaged and therefore have a largely reduced usable life.

FIG. 1 schematically shows the motion relation between a compound oblique upper knife N1 and a straight bed knife N2. As shown, the oblique upper knife N1 contacts with the straight bed knife N2 at multiple contact points at the instant of cutting, and the upper knife is subjected to relatively large impact and vibration.

Paper cutting mechanisms with one-piece oblique upper knife or simple spiral upper knife and straight bed knife have been developed in an attempt to overcome the drawbacks of the paper cutting mechanism with compound oblique upper knife and straight bed knife. FIG. 2 schematically shows the motion relation between a one-piece oblique or a simple spiral upper knife N3 and a straight bed knife N4. As can be seen from FIG. 2, while the oblique upper knife N3 contact with the straight bed knife N4 at only one contact point at the instant of cutting, the oblique upper knife N3 is fed at a relatively quick speed and is still subjected to a relatively large impact and vibration.

SUMMARY OF THE INVENTION

It is therefore a primary object of the present invention to provide a tissue paper cutting mechanism having upper knife with variable spiral curve angle. The upper knife with variable spiral curve angle is associated with a structural surface of a knife carrier thereof in such as manner that, in the process of cutting the tissue paper, an angle contained between an axis of the upper knife and a tangential line to an outer circumferential surface of a bed knife roller cooperating with the upper knife non-linearly varies with every change of the cutting position on the upper knife.

Another object of the present invention is to provide an upper knife structure with variable spiral curve angle for a tissue paper cutting mechanism. The upper knife is associated with a structural surface of a knife carrier thereof to extend along a longitudinal axis of the knife carrier from an end to the other opposite end thereof in a spiral direction.

Compared to the conventional upper knives for the paper cutting mechanisms, the upper knife with variable spiral curve angle of the present invention is in point contact with the straight bed knife on a bed knife roller at only one contact point at the instant of cutting, and a curvilinear angle between the upper knife and the straight bed knife on the bed knife roller non-linearly varies with every change of cutting position on the upper knife. In this manner, the upper knife and the straight bed knives on the bed knife roller are always in stable point contact with one another, enabling the knives to have a prolonged usable life.

The angle contained between the axis of the upper knife and the tangential line to the outer circumferential surface of the bed knife roller non-linearly varies with every change of the cutting position on the upper knife. With the adjustment made to the spiral curve angle on the upper knife in the present invention, deformation amounts at two end points and a middle point of the upper knife will gradually become closer to one another, and the upper knife is protected against damage due to a particularly high deformation amount at a certain point that bears a force. Therefore, the upper knife may have a prolonged service life to allow increased production efficiency. In the present invention, a cutting speed at the beginning of cutting is particularly reduced to effectively soften the impact at the instant of cutting and reduce the vibration of the knife.

To achieve the above objects, in accordance with the present invention, there is provided a tissue paper cutting mechanism having upper knife with variable spiral curve angle. The tissue paper cutting mechanism comprises a base, a bed knife roller rotatably mounted on the base and provided on a circumferential surface with a plurality of straight bed knives radially spaced at predetermined intervals, a knife carrier mounted on the base near the bed knife roller at an axis skew angle relative to the bed knife roller, and an upper knife associated with a structural surface of the knife carrier to extend along a longitudinal axis direction of the knife carrier from an end to another opposite end thereof in a spiral direction, such that an angle contained between an axis of the upper knife and a tangential line to the circumferential surface of the bed knife roller non-linearly varies with every change of the cutting position on the upper knife.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
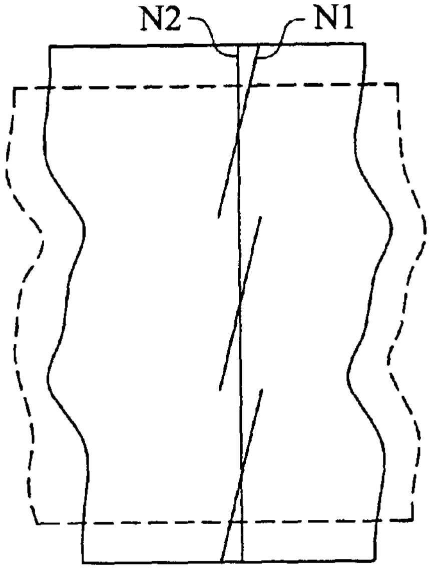
FIG.1(Prior Art)
FIG. 1 is a developed plan view showing the motion relation between a compound oblique upper knife and a straight bed knife in the prior art.
Figure 2:
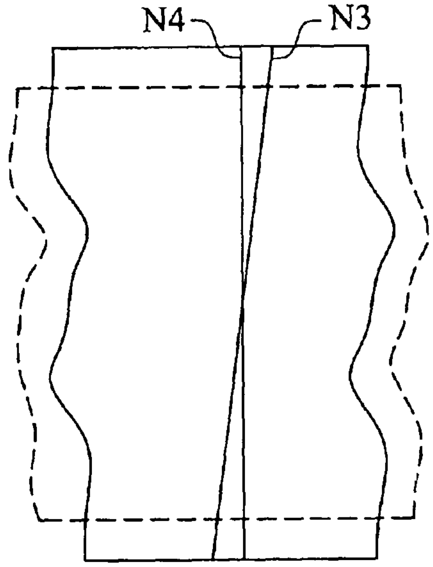
FIG.2(Prior Art)
FIG. 2 is a developed plan view showing the motion relation between a one-piece oblique or a simple spiral curve upper knife and a straight bed knife in the prior art.
Figure 3:
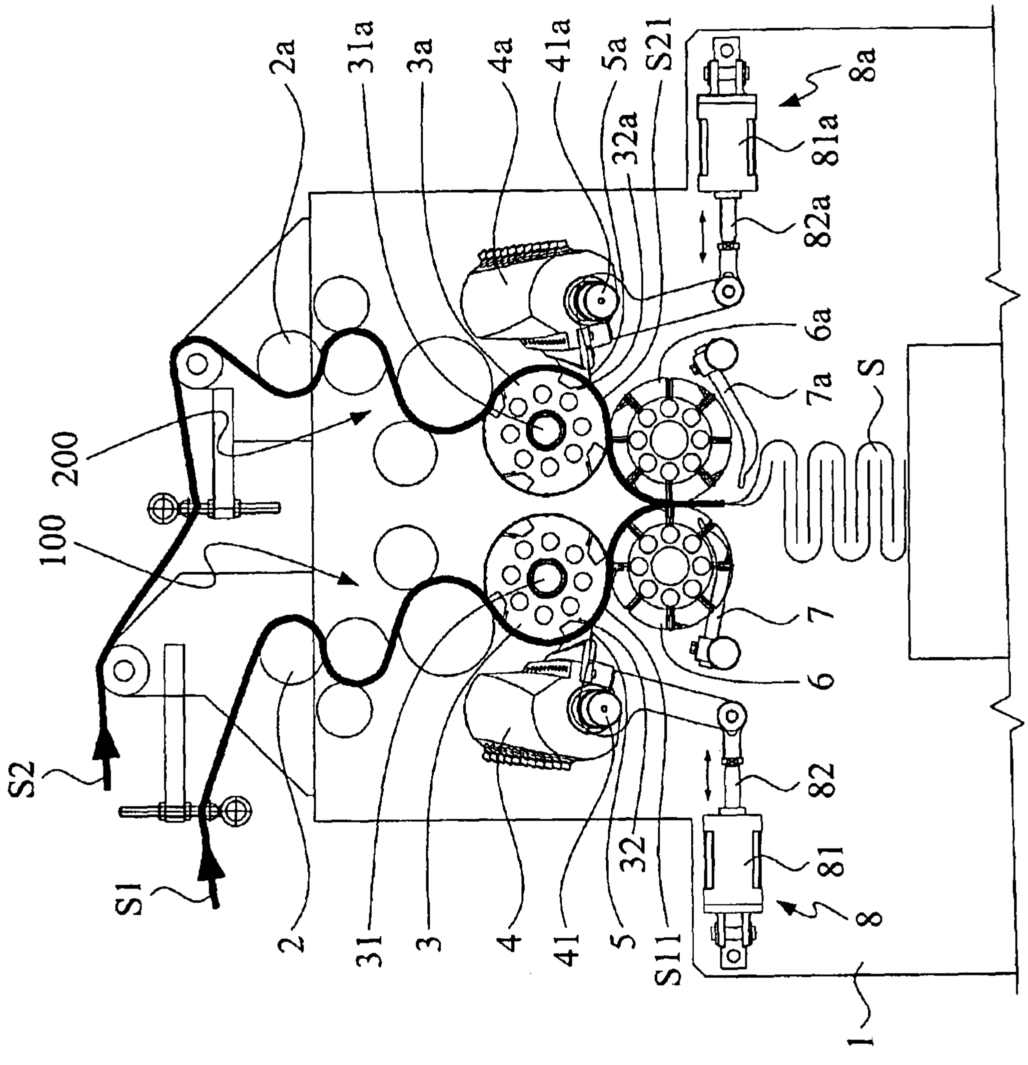
FIG. 3 shows the arrangement of various relevant components included in a tissue paper cutting mechanism having upper knife with variable spiral curve angle according to the present invention.

Please refer to FIG. 3 that shows the arrangement of various components included in a tissue paper cutting mechanism according to a preferred embodiment of the present invention. As shown, the tissue paper cutting mechanism of the present invention includes a base 1, on which a first and a second cutting mechanism 100, 200 are laterally symmetrically arranged. Two long tapes of tissue paper S1, S2 having a predetermined width are separately fed to the two cutting mechanisms 100, 200, and are conveyed through, cut, pressed to form folds, picked, overlapped, and folded to produce a stack of interfolded paper S.

The first cutting mechanism 100 includes a plurality of idlers 2, a bed knife roller 3, a knife carrier 4, an upper knife 5, a fold-forming roller 6, a packer finger 7, and a pneumatic control device 8. The bed knife roller 3 is provided on an outer circumferential surface with a plurality of straight bed knives 32 radially spaced at predetermined intervals. The bed knife roller 3 has a roller shaft 31 for rotatably mounting the bed knife roller 3 to a predetermined position on the base 1. The knife carrier 4 includes a carrier shaft 41 for mounting the knife carrier 4 on the base 1 at a position in the vicinity of the bed knife roller 3.

The long tape of tissue paper S1 is fed through the idlers 2 of the first cutting mechanism 100 and conveyed to the bed knife roller 3, which is rotated in a predetermined rotating direction. At this point, a shear contact is formed between the upper knife 5 and one of the straight bed knives 32 on the bed knife roller 3 to cut the long tape of tissue paper S1 to a regular length paper piece S11, which is then conveyed to the fold-forming roller 6.

Similarly, the second cutting mechanism 200 includes a plurality of idlers 2*a*, a bed knife roller 3*a*, a knife carrier 4*a*, an upper knife 5*a*, a fold-forming roller 6*a*, a packer finger 7*a*, and a pneumatic control device 8*a*. The bed knife roller 3*a* is provided on an outer circumferential surface with a plurality of straight bed knives 32*a* radially spaced at predetermined intervals. The bed knife roller 3*a* has a roller shaft 31*a* for rotatably mounting the bed knife roller 3*a* to a predetermined position on the base 1. The knife carrier 4*a* includes a carrier shaft 41*a* for mounting the knife carrier 4*a* on the base 1 at a position in the vicinity of the bed knife roller 3*a*.

The long tape of tissue paper S2 is fed through the idlers 2*a* of the second cutting mechanism 200 and conveyed to the bed knife roller 3*a*, which is rotated in a predetermined rotating direction. At this point, a shear contact is formed between the upper knife 5*a* and one of the straight bed knives 32*a* on the bed knife roller 3*a* to cut the long tape of tissue paper S2 to a regular length paper piece S21, which is then conveyed to the fold-forming roller 6*a*.

The fold-forming rollers 6, 6*a* are provided on respective circumferential surface with fold-forming means to form folds on the paper pieces S11, S21 conveyed to the fold-forming rollers 6, 6*a*. The paper pieces S11, S21 with folds are then picked and pressed by the packer fingers 7, 7*a*, so as to be overlapped and folded along the folds to form a stack of interfolded paper S.

The bed knife rollers 3, 3*a* and the fold-forming rollers 6, 6*a* are independently connected to a conventional suction unit (not shown), and have a plurality of air holes provided on the circumferential surfaces thereof. Through controlling the suction units, the long tapes of tissue paper S1, S2 and the paper pieces S11, S21 may be sucked to or released from the circumferential surfaces of the bed knife rollers 3, 3*a* and the fold-forming rollers 6, 6*a*, respectively.

The pneumatic control device 8 includes an air cylinder 81 and an extension arm 82 movably connected to the knife carrier 4. Similarly, the pneumatic control device 8*a* includes an air cylinder 81*a* and an extension arm 82*a* movably connected to the knife carrier 4*a*. When the long tape of tissue paper S1, S2 is used up, the air cylinder 81, 81*a* is actuated to extend or retract the extension arm 82, 82*a*, so as to control the knife carrier 4, 4*a* to turn by a predetermined angle, allowing the upper knife 5, 5*a* to move away from the corresponding straight bed knife 32, 32*a* on the bed knife roller 3, 3*a* to a distant position, so that an operator may introduce a new long tape of tissue paper S1, S2 into the cutting mechanism 100, 200 for use. Thereafter, the air cylinder 81, 81*a* may be actuated again to control the extension arm 82, 82*a* to turn the knife carrier 4, 4*a* back to an initial cutting position. That is, the knife carrier 4, 4*a* is approached toward the bed knife roller 3, 3*a* to continue the production of the interfolded paper S.

Figure 4:
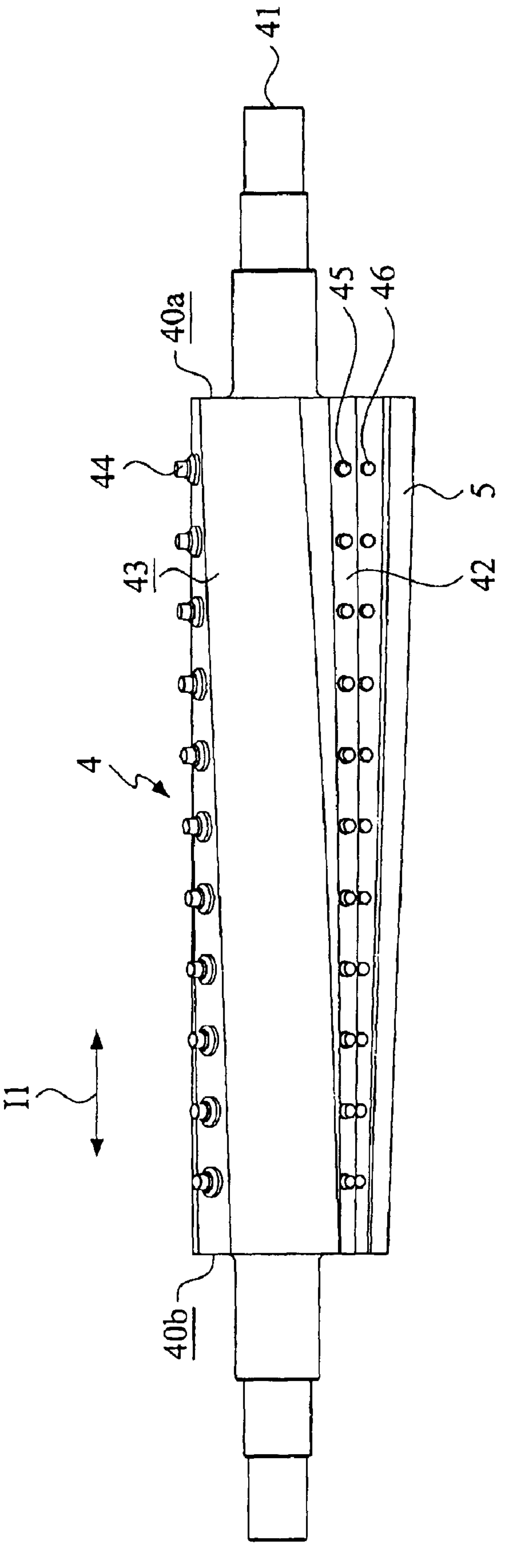
FIG. 4 is a front view showing the association of an upper knife with a knife carrier thereof in the present invention.
Figure 5:
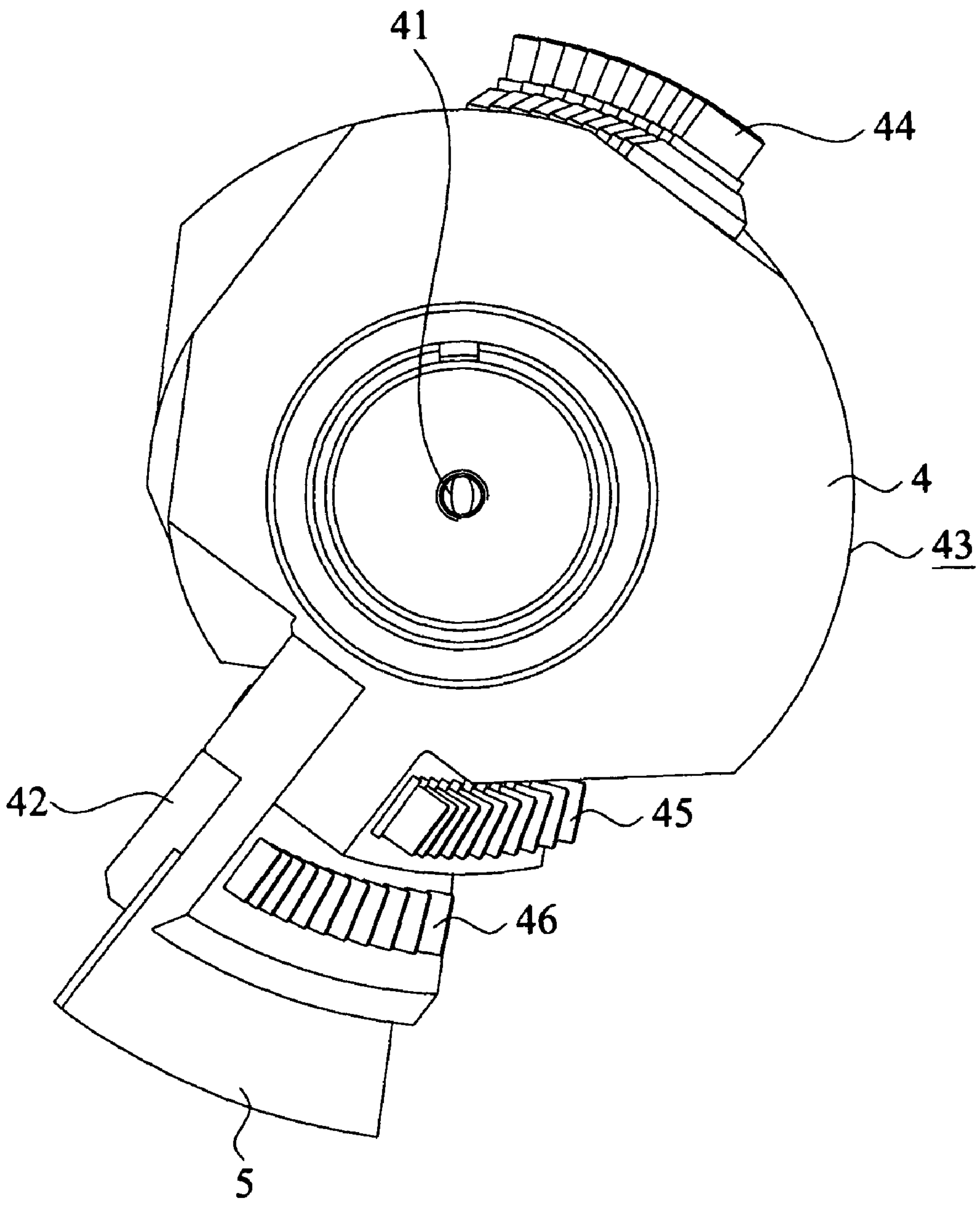
FIG. 5 is an end view showing the association of the upper knife with the knife carrier thereof in the present invention.

Since the components of the first and the second cutting mechanism 100, 200 are identically arranged, only the first cutting mechanism 100 is further described in more details about the structure thereof. Please refer to FIGS. 4 and 5 that are front and end views, respectively, showing the arrangement of the upper knife 5 on the knife carrier 4 in the present invention. As shown, the knife carrier 4 includes a knife holder 42, to which the upper knife 5 fixedly held.

The knife holder 42 is formed on a structural surface 43 of the knife carrier 4 to extend along a longitudinal axis direction I1 of the knife carrier 4 from an end 40*a* to another opposite end 40*b* thereof in a spiral direction.

The upper knife 5 is held to the knife holder 42, and is therefore located on the structural surface 43 of the knife carrier 4 to extend along the longitudinal axis direction I1 of the knife carrier 4 from the end 40*a* to the opposite end 40*b* thereof in a spiral direction.

The knife carrier 4 is also provided at predetermined positions with a knife projecting length adjusting unit 44 for adjusting the length by which the upper knife 5 is projected from the knife carrier 4, a knife clamping adjusting unit 46 for adjusting the tightness by which the upper knife 5 is held to the knife holder 42 of the knife carrier 4, and a knife curvature adjusting unit 45 for adjusting a curvature of the upper knife 5.

Figure 6:
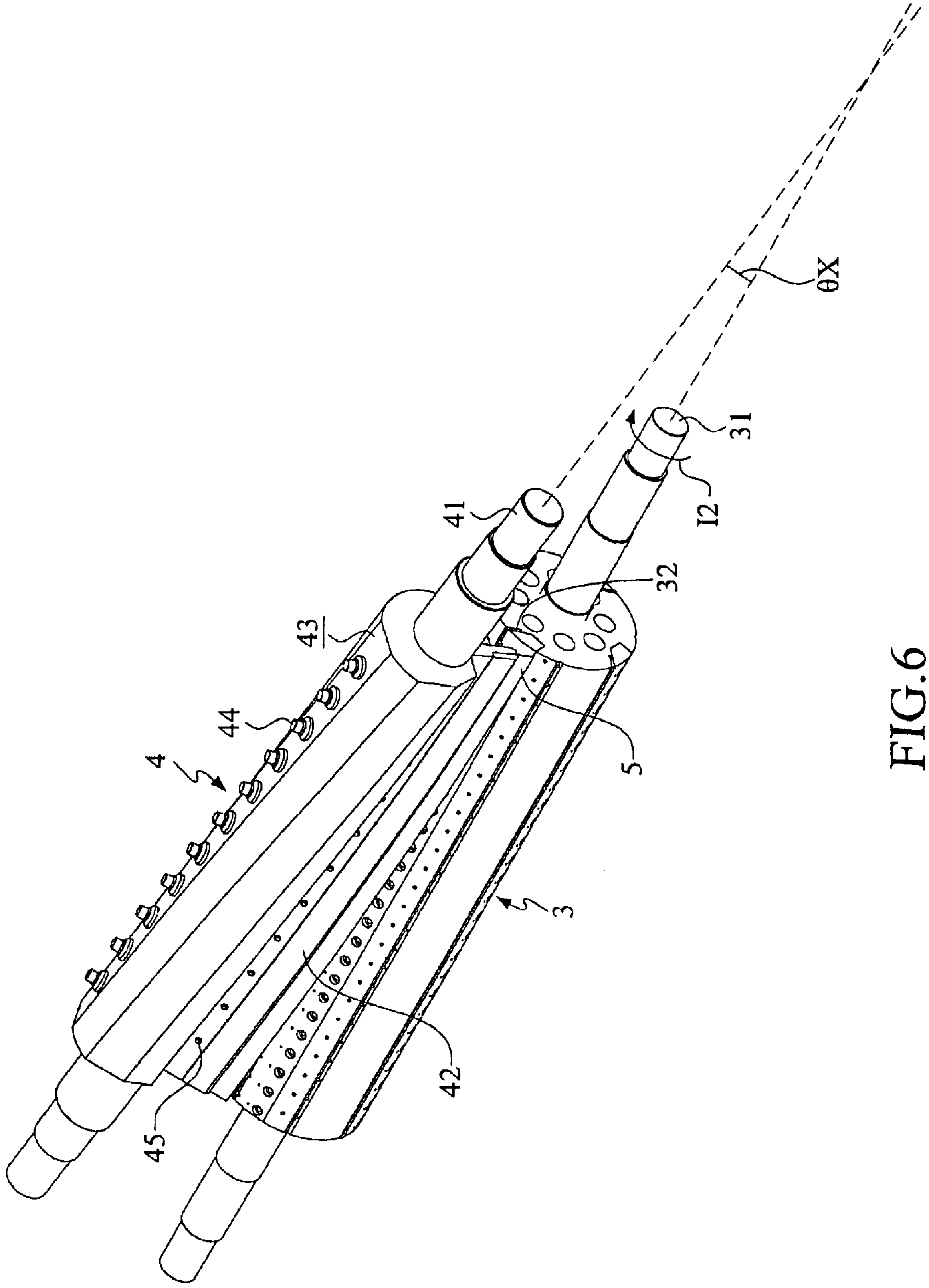
FIG. 6 is a perspective view showing the mounting position of the knife carrier relative to a bed knife roller in the present invention.

FIG. 6 is a perspective view showing the mounting position of the knife carrier 4 relative to the bed knife roller 3 in the present invention. As shown, the bed knife roller 3 may be rotated in a rotating direction I2, and an axis skew angle θx is contained between the knife carrier 4 and the bed knife roller 3.

Figure 7:
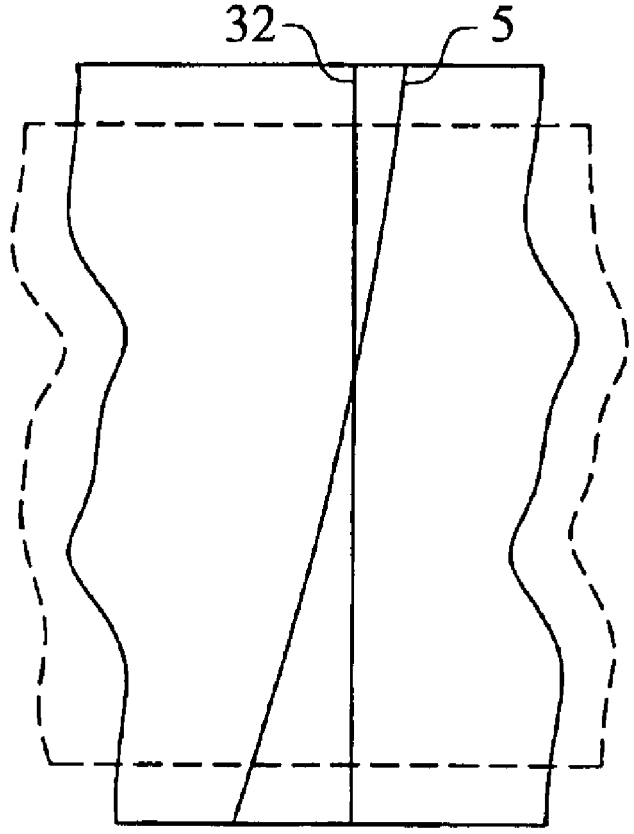
FIG. 7 is a developed plan view showing the motion relation between the upper knife with variable spiral curve angle and a straight bed knife on the bed knife roller in the present invention.

FIG. 7 is a developed plan view showing the motion relation between the upper knife 5 and the straight bed knife 32 on the bed knife roller 3 in the present invention. As shown, during a paper cutting operation on the cutting mechanism 100, the upper knife 5 is always in point contact with the straight bed knife 32 at only one single point, and a curvilinear angle between the upper knife and the straight bed knife on the bed knife roller non-linearly varies with every change of cutting position on the upper knife. In this manner, the upper knife and the straight bed knives on the bed knife roller are always in stable point contact with one another, enabling the knives to have a prolonged usable life. In the present invention, a cutting speed at the beginning of cutting is particularly reduced to effectively reduce the vibration of the knife.

Figure 8:
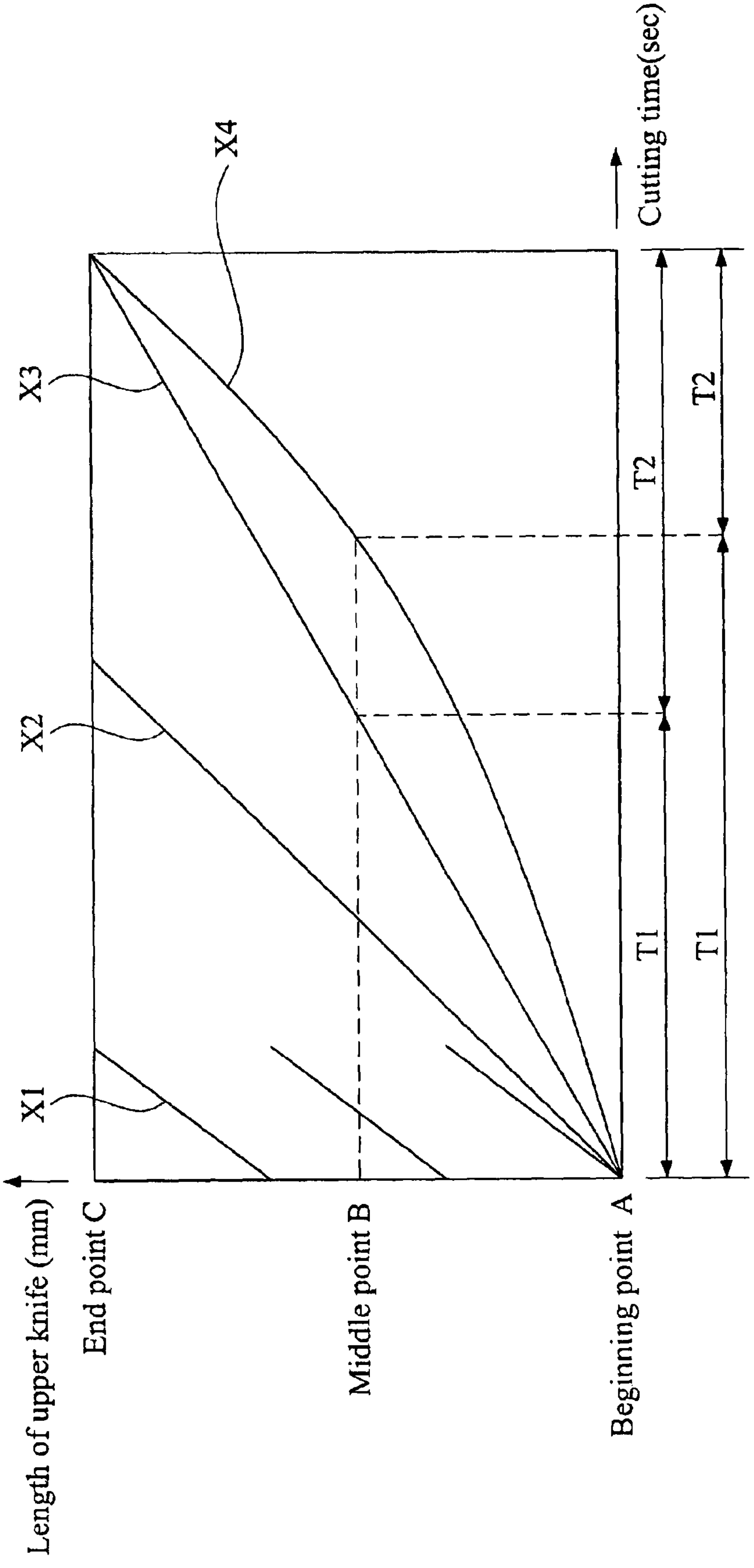
FIG. 8 is a curve diagram showing and comparing the cutting characteristics of commonly employed conventional upper knives and the upper knife of the present invention.

FIG. 8 is a curve diagram showing and comparing the cutting characteristics of some other commonly employed upper knives and the upper knife 5 of the present invention. In the curve diagram of FIG. 8, the abscissa indicates cutting time in second (sec), and the ordinate indicates a transverse length of the upper knife in millimeter (mm). The curve X1 in the diagram represents a conventional compound oblique upper knife is in contact with the straight bed knife at multiple points at the instant of cutting, and the cutting time thereof is very short, indicating that the knife must be bearing a relatively large impact and subjected to vibration at the instant of cutting. The curve X2 in the diagram represents a conventional one-piece oblique upper knife is in contact with the straight bed knife at only one single point at the instant of cutting, and the cutting time is still relatively short, indicating the knife is still fed at a relatively high speed, and accordingly, still subjected to a relatively large impact and vibration. The curve X3 represents the cutting characteristics of a simple spiral type upper knife. As can be seen from the curve X3 in the curve diagram of FIG. 8, a cutting time T1 for the cutting from a beginning point A to a middle point B of the upper knife is almost equal to a cutting time T2 for the cutting from the middle point B to an end point C of the upper knife, indicating that the cutting is conducted at a fixed speed. And, the curve X4 represents the cutting characteristics of the upper knife 5 of the present invention. As can be seen from the curve X4 in the curve diagram of FIG. 8, the cutting time T1 for the cutting from the beginning point A to the middle point B of the upper knife 5 is far longer than the cutting time T2 for the cutting from the middle point B to the end point C of the upper knife 5, indicating that, in the present invention, the cutting speed at the beginning of cutting is particularly reduced, so as to effectively soften an instantaneous impact to the upper knife at the beginning of cutting and reduce the vibration of the upper knife. In this manner, the knife may have reduced loss to increase the service life thereof.

Figure 9:
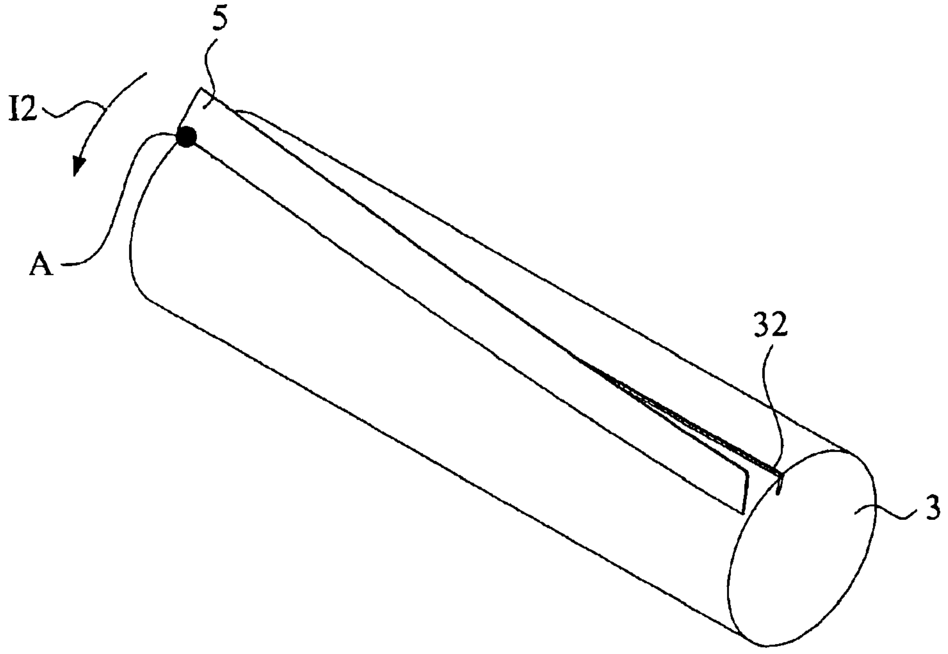
FIG. 9 shows the upper knife of the present invention contacts at a beginning point A with a straight bed knife on the bed knife roller to start cutting.
Figure 10:
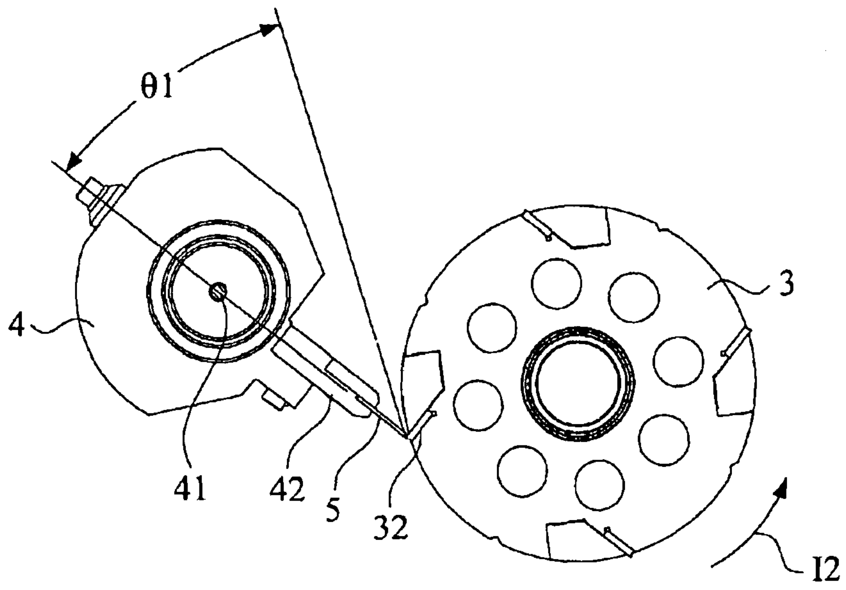
FIG. 10 is a sectional view showing a contained angle θ1 between an axis of the upper knife and a tangential line to an outer circumferential surface of the bed knife roller when the upper knife contacts at the point A with the straight bed knife.
Figure 11:
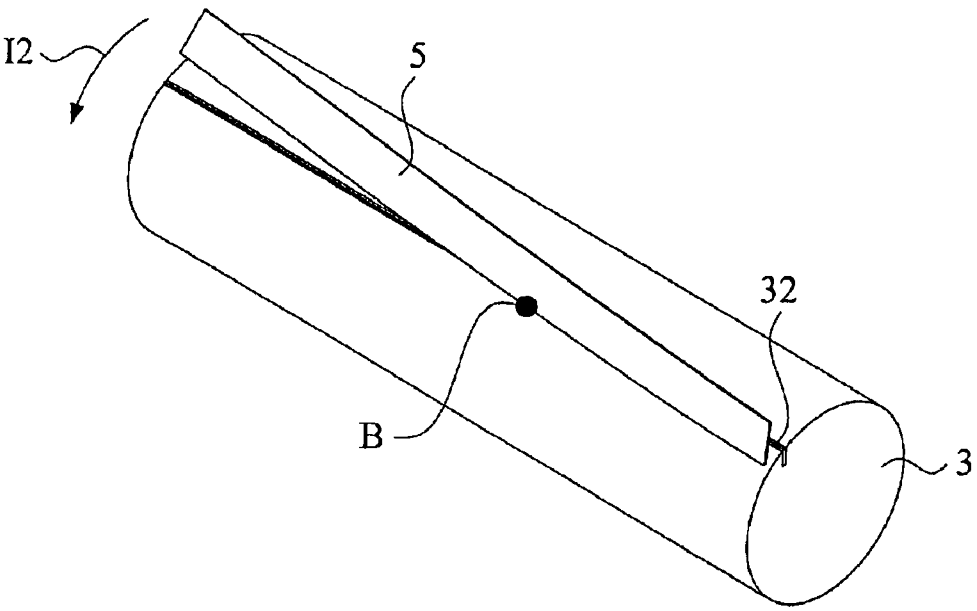
FIG. 11 shows the cutting performed by the upper knife of the present invention and the straight knife on the bed knife roller has been progressed to a middle position of the upper knife as indicated by point B.
Figure 12:
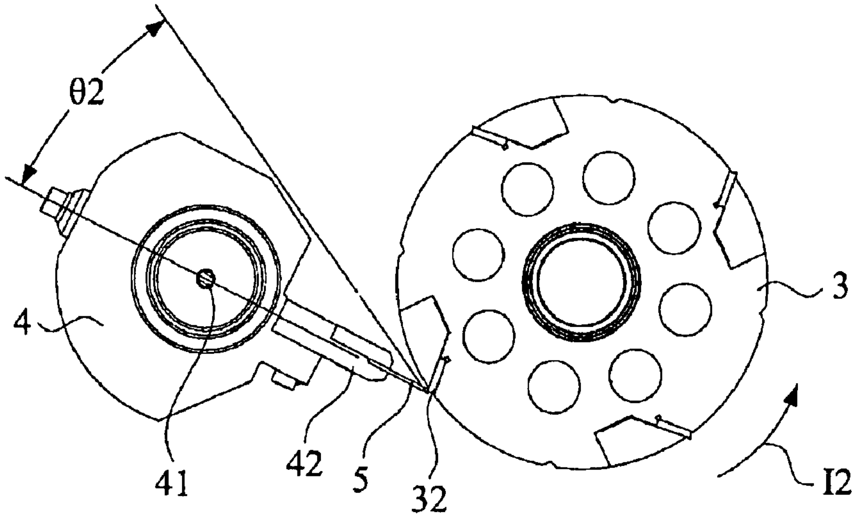
FIG. 12 is a sectional view showing a contained angle θ2 between the axis of the upper knife and a tangential line to the outer circumferential surface of the bed knife roller when the upper knife contacts at the point B with the straight bed knife.
Figure 13:
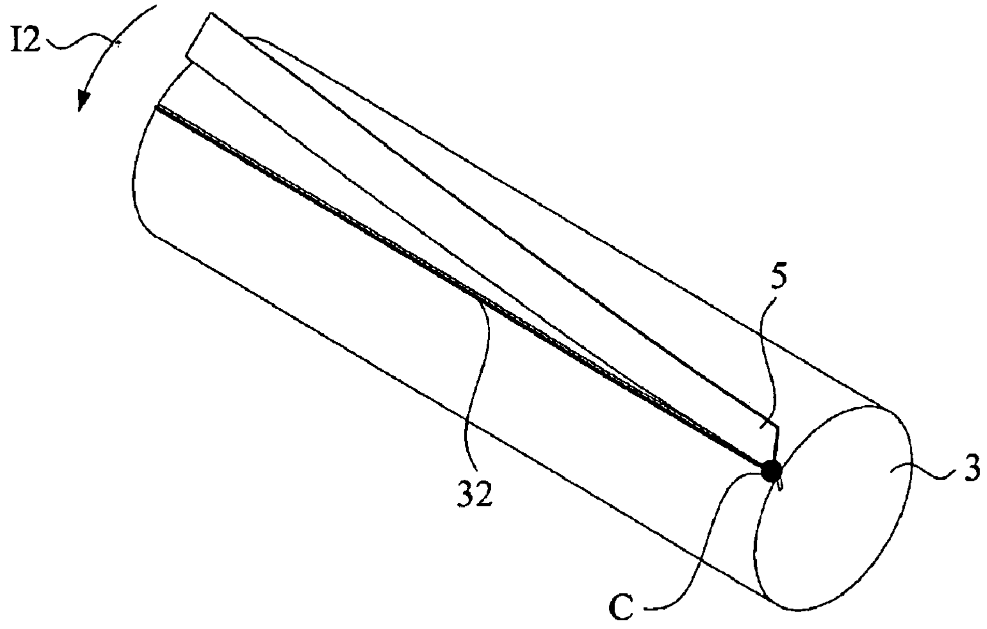
FIG. 13 shows the cutting performed by the upper knife of the present invention and the straight knife on the bed knife roller has been progressed to an end position of the upper knife as indicated by point C.
Figure 14:
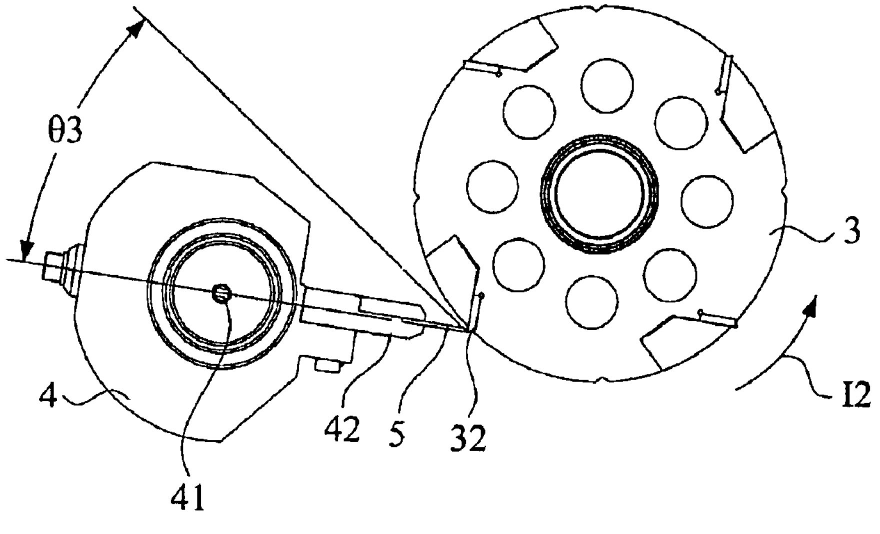
FIG. 14 is a sectional view showing a contained angle θ3 between the axis of the upper knife and a tangential line to the outer circumferential surface of the bed knife roller when the upper knife contacts at the point C with the straight bed knife.

FIG. 9 is a perspective view showing the upper knife 5 initially contacts at a beginning point A with the straight bed knife 32 on the bed knife roller 3 to start cutting. FIG. 10 is a sectional view showing a contained angle θ1 between an axis of the upper knife 5 and a tangential line to the outer circumferential surface of the bed knife roller 3 when the upper knife 5 initially contacts at the point A with the straight bed knife 32 on the bed knife roller 3 as shown in FIG. 9. FIG. 11 is a perspective view showing the cutting performed by the upper knife 5 and the straight knife 32 on the bed knife roller 3 has been progressed to a middle position of the upper knife 5 indicated as point B. FIG. 12 is a sectional view showing a contained angle θ2 between the axis of the upper knife 5 and a tangential line to the outer circumferential surface of the bed knife roller 3 when the upper knife 5 contacts at the middle point B with the straight bed knife 32 on the bed knife roller 3 as shown in FIG. 11. FIG. 13 is a perspective view showing the cutting performed by the upper knife 5 and the straight knife 32 on the bed knife roller 3 has been progressed to an end position of the upper knife 5 indicated as point C. And, FIG. 14 is a sectional view showing a contained angle θ3 between the axis of the upper knife 5 and a tangential line to the outer circumferential surface of the bed knife roller 3 when the upper knife 5 contacts at the end point C with the straight bed knife 32 on the bed knife roller 3 as shown in FIG. 13.

Figure 15:
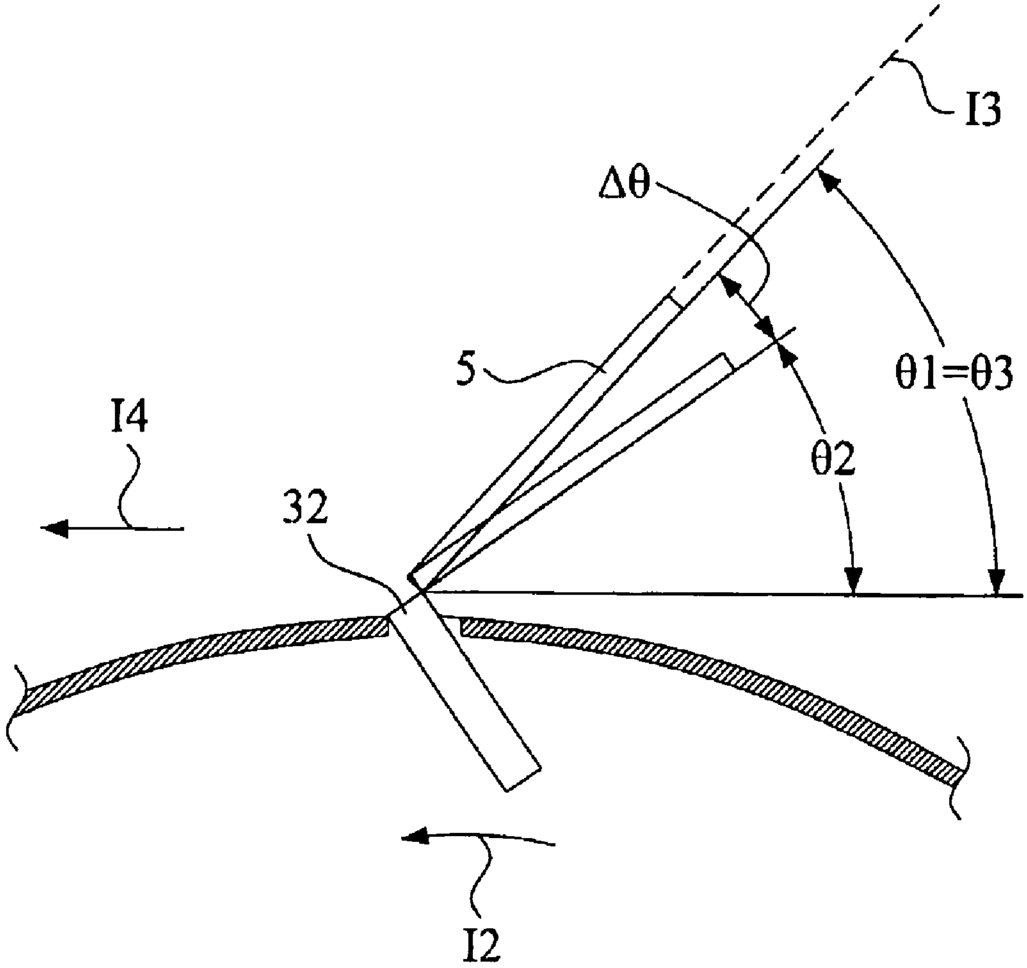
FIG. 15 is a simplified view showing different contained angles between the axis of the upper knife and the tangential line to the outer circumferential surface of the bed knife roller.

It is found θ1>θ2, θ2<θ3, and θ1=θ3, indicating the contained angle θ between the axis of the upper knife 5 and the tangential line to the circumferential surface of the bed knife roller 3 varies with every change of cutting position on the upper knife 5. In other words, the contained angle θ is non-linearly variable. FIG. 15 is a simplified view showing changes in the contained angle θ between the axis I3 of the upper knife 5 and the tangential line I4 to the outer circumferential surface of the bed knife roller 3. As shown, with every change of the cutting position on the upper knife 5, the contained angle θ periodically non-linearly varies from θ1 to θ2 and then from θ2 to θ3, and the variation thereof is represented as Δθ.

Figure 16:
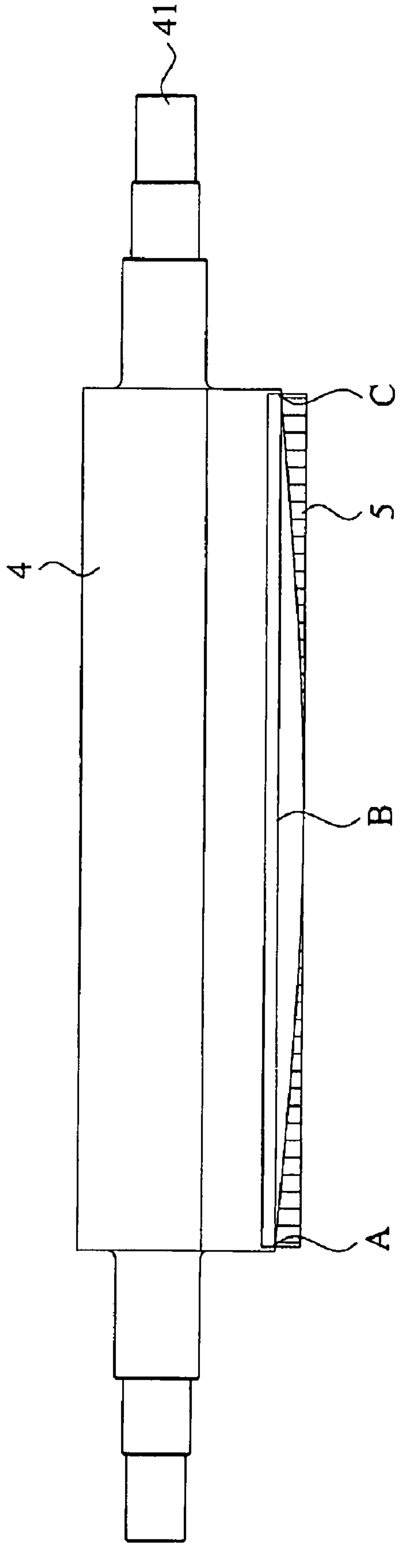
FIG. 16 is a front view describing the deformed condition of the upper knife when it is in use.
Figure 17:
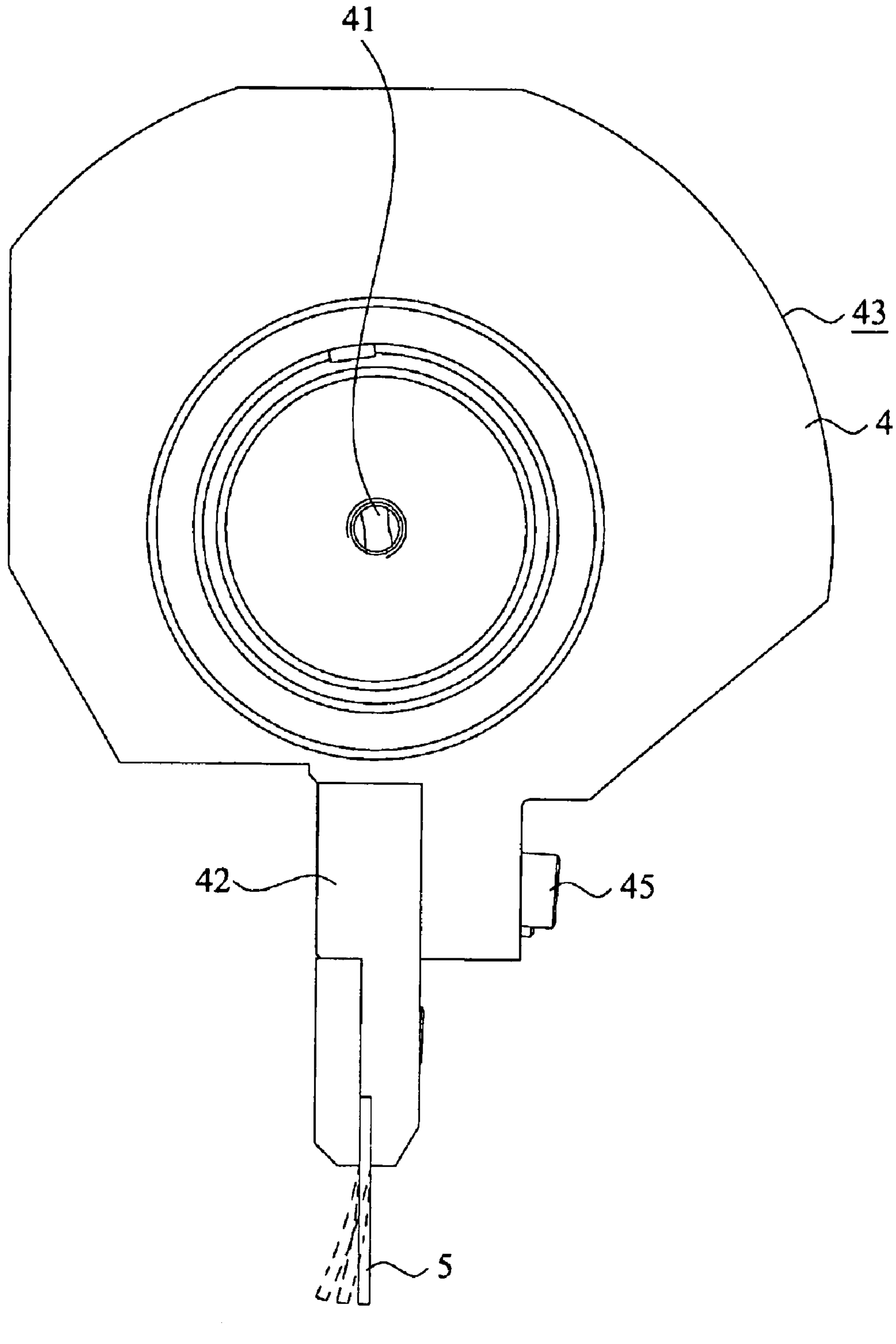
FIG. 17 is a side view describing the deformed condition of the upper knife when it is in use.
Figure 18:
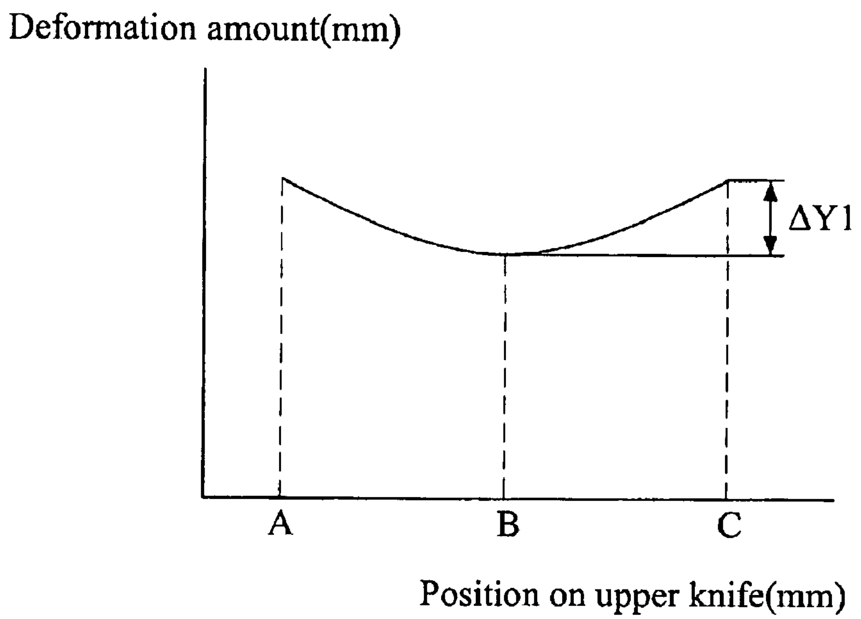
FIG. 18 is a curve diagram showing the deformation amounts at different points on the upper knife bearing a force while a variable spiral curve angle effect is ignored.
Figure 19:
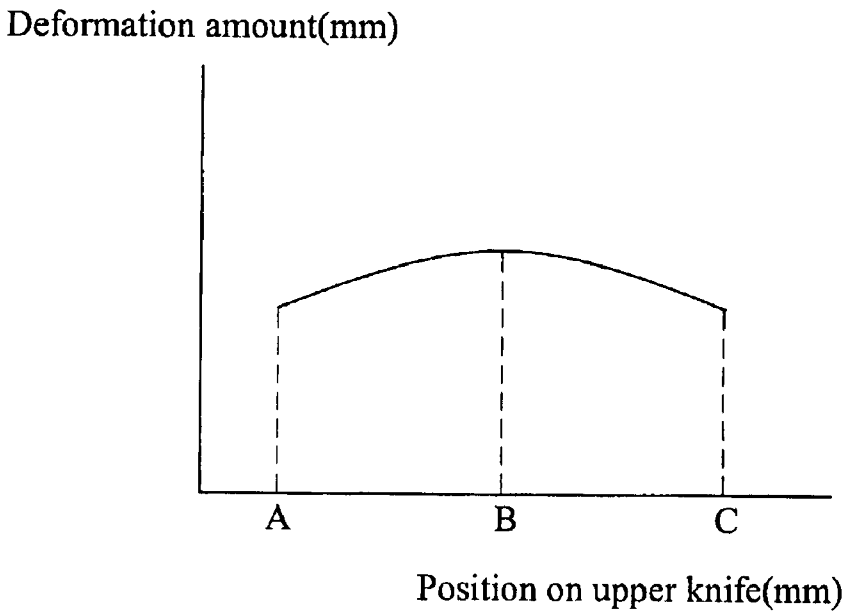
FIG. 19 is a curve diagram showing the deformation amounts at different points on the upper knife bearing a force while only a variable spiral curve angle effect is taken into consideration.
Figure 20:
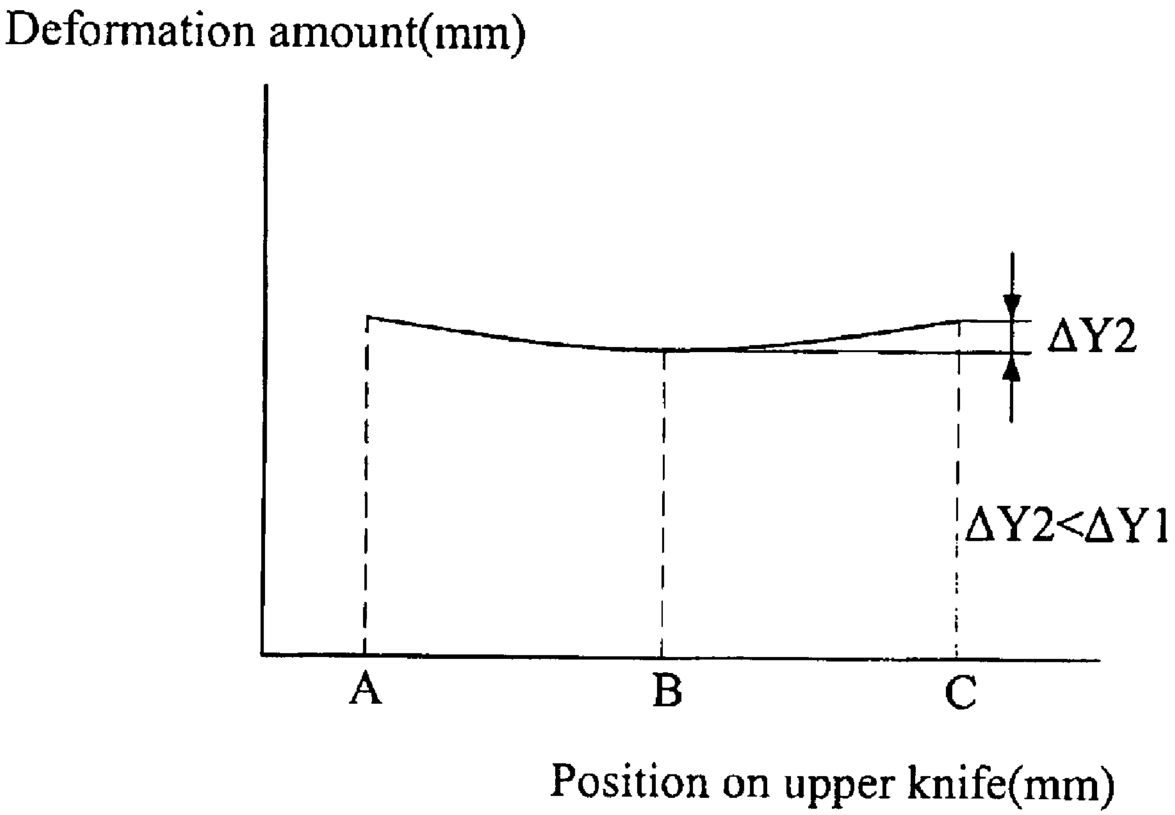
FIG. 20 is a curve diagram obtained from FIGS. 18 and 19 to show the total deformation amounts at different points on the upper knife bearing a force.

FIGS. 16 and 17 are front and side views, respectively, describing the deformed condition of the upper knife 5 when it is in use. FIGS. 18, 19, and 20 are curve diagrams showing the deformation amounts of the upper knife 5 at different points A, B, and C thereof.

FIG. 18 indicates the upper knife 5 fixed to the knife carrier 4 normally has two outer end points A and C with a somewhat weak strength; and when the upper knife 5 bears a force at the two end points A and C, the deformation amounts at points A, C are larger than the deformation amount at a middle point B when the upper knife 5 bears a force at the point B. In FIG. 18, the amounts of deformation are shown by broken lines. Please refer to FIGS. 16 and 18 at the same time. The broken lines at the two end points A and C are longer, compared to the broken line at the middle point B, indicating the amounts of deformation at these two end points A, C are relatively large. In FIG. 18, ΔY1 is a difference between the deformation amounts at the two end points A and C and the deformation amount at the middle point B.

FIG. 19 indicates the contained angle between the axis I3 of the upper knife 5 and the tangential line I4 to the outer circumferential surface of the bed knife roller 3 varies with change in the cutting position on the upper knife 5. From the principle of mechanics, the larger the contained angle θ is, the smaller an effective component of the bearing force is, and accordingly, the smaller the deformation amount of the knife is. In the present invention, the contained angles θ1 and θ3 at the end points A and C, respectively, are larger than the contained angle θ2 at the middle point B. When concluding simply from this point, the deformation amounts at the two end points A, C are smaller, and the deformation amount at the middle point B is larger.

FIG. 20 is a curve diagram showing a total effect from FIGS. 18 and 19, and ΔY2 is a difference between the deformation amounts at the two end points A and C and the deformation amount at the middle point B. And, it is found ΔY2<ΔY1, indicating that when the angle of the spiral curve of the upper knife 5 is adjusted according to the present invention, the deformation amounts at the two end points A, C and the deformation amount at the middle point B get closer to one another. In this manner, it is possible to protect the upper knife against damage due to a particularly high deformation amount at a certain point that bears a force. Therefore, the knife may have a prolonged service life.

While the present invention has been described with reference to the specific embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A tissue paper cutting mechanism for cutting a long tape of tissue paper into a plurality of regular length paper pieces, comprising:

a base;

a bed knife roller including a roller shaft mounted to the base so that the bed knife roller is rotatable in a predetermined rotating direction about a first longitudinal axis, the bed knife roller having a plurality of straight bed knives provided on a circumferential surface at angularly spaced intervals in parallel with said first longitudinal axis;

a knife carrier including a carrier shaft mounted to the base at a position in the vicinity of the bed knife roller, the knife carrier being disposed at second longitudinal axis, the second longitudinal being at a horizontal axis skew angle with respect to the axis of the bed knives; and an upper knife secured to a structural surface of the knife carrier to extend between opposing longitudinal ends thereof, the upper knife extending arcuately in a non-linear spiral contour to define an angle of inclination relative to a tangent of the bed knife roller at a point of contact with one of the bed knives, the angle varying during a cut along the length of the upper knife;

whereby when the long tape of tissue paper is fed and conveyed between the knife carrier and one of the bed knives roller, a single point shearing contact is formed between the upper knife and the bed knife of the bed knife roller to cut the tissue paper.

2. The tissue paper cutting mechanism as claimed in claim 1, further comprising a plurality of idlers, via which the long tape of tissue paper is fed and conveyed through between the upper knife and the bed knife roller.

3. The tissue paper cutting mechanism as claimed in claim 1, further comprising a fold-forming roller mounted to a position in the vicinity of the bed knife roller for forming folds on the regular length paper pieces.

4. The tissue paper cutting mechanism as claimed in claim 1, further comprising a pneumatic control device, which includes an air cylinder and an extension arm connected to the knife carrier; the extension arm being controlled by the pneumatic control device to extend or retract, so as to control the upper knife to move away from a corresponding one of the straight bed knives on the bed knife roller to a predetermined distant position, or to approach toward the bed knife roller.

5. The tissue paper cutting mechanism as claimed in claim 1, wherein the knife carrier is provided with a knife projecting length adjusting unit for adjusting a length of the upper knife projected from the knife carrier, a knife clamping adjusting unit for adjusting a tightness by which the upper knife is held to the knife carrier, and a knife curvature adjusting unit for adjusting a curvature of the non-linear spiral contour of the upper knife.

6. The tissue paper cutting mechanism as claimed in claim 1, wherein the non-linear spiral contour of the upper knife has a curvature providing a cutting time for a first half of a cut across the tape of tissue paper being greater than a cutting time for a remaining half of the cut across the tape of tissue paper to thereby soften an initial impact between the upper blade and the bed knives.

* * * * *